United States Patent [19]
Chau

[11] Patent Number: 5,350,540
[45] Date of Patent: Sep. 27, 1994

[54] METHOD OF MAKING ALKALINE EARTH METAL HALOPHOSPHATE PHOSPHOR USING METAL PHOSPHIDE REDUCING AGENT

[75] Inventor: Chung-Nin Chau, Sayre, Pa.

[73] Assignee: Osram Sylvania Inc., Danvers, Mass.

[21] Appl. No.: 104,229

[22] Filed: Aug. 9, 1993

Related U.S. Application Data

[63] Continuation-in-part of Ser. No. 965,094, Oct. 22, 1992, Pat. No. 5,268,124.

[51] Int. Cl.⁵ .............................................. C09K 11/73
[52] U.S. Cl. ............................................... 252/301.6 P
[58] Field of Search .................... 252/301.4 P, 301.6 P

[56] References Cited

U.S. PATENT DOCUMENTS

| | | |
|---|---|---|
| 2,691,601 | 10/1954 | Butler et al. ................... 252/301.4 P |
| 3,378,499 | 4/1968 | Hickok ........................... 252/301.4 P |
| 3,430,089 | 2/1969 | Sarver et al. ................... 252/301.4 P |
| 4,897,217 | 1/1990 | Jackson et al. ................ 252/301.4 P |
| 5,268,124 | 12/1993 | Chau .............................. 252/301.4 P |

*Primary Examiner*—Jack Cooper
*Attorney, Agent, or Firm*—Elizabeth A. Levy; Robert F. Clark

[57] ABSTRACT

Metal phosphide used as a raw material in the synthesis of alkaline earth metal halophosphate phosphor activated by antimony and manganese acts as a reducing agent to prevent oxidation of the antimony and manganese. The result is maximum availability of trivalent antimony and divalent manganese for incorporation into the phosphor lattice.

3 Claims, 2 Drawing Sheets

METHOD OF MAKING ALKALINE EARTH METAL HALOPHOSPHATE PHOSPHOR USING METAL PHOSPHIDE REDUCING AGENT

This application is a continuation-in-part of application Ser. No. 07/965,094, filed Oct. 22, 1992, now Pat. No. 5,268,124.

TECHNICAL FIELD

This invention relates to methods of making alkaline earth metal halophosphate phosphor activated by antimony and manganese. More particularly, it relates to methods of making such phosphors wherein a metal phosphide reducing agent is introduced during synthesis of the phosphor.

BACKGROUND ART

Synthesis of alkaline earth metal halophosphate phosphor activated by antimony and manganese requires that the activators be provided in their lowest oxidation states, that is, trivalent (3+) antimony and divalent (2+) manganese. However, during firing the antimony and manganese tend to oxidize to form pentavalent (5+) antimony and tetravalent (4+) manganese. Pentavalent antimony and tetravalent manganese are not incorporated into the phosphor lattice and are thus wasted. The presence of antimony which is not in the trivalent state during the synthesis of alkaline earth metal halophosphate phosphor activated by antimony and manganese has been associated with reduced luminescence efficiency.

The desirability of maintaining a high concentration of trivalent antimony content during synthesis of alkaline earth metal halophosphate phosphor has been recognized. U.S. Pat. No. 3,468,812 to Wanmaker et al. discloses the use of antimonite, $(SbO_2)_n{}^{n-}$, instead of the more volatile antimony trioxide, $Sb_2O_3$, as the source of antimony in order to retain more trivalent antimony during synthesis of alkaline earth metal halophosphate phosphor. U.S. Pat. No. 3,378,499 to Hickok discloses that greater concentrations of trivalent antimony may be obtained in calcium halophosphate phosphor if calcium chlorospodiosite is used as the chloride source instead of ammonium chloride. British Patent 1,371,968 to Philips discloses the use of two firing steps to ensure the availability of sufficient amounts of trivalent antimony in the resulting phosphor.

While such methods do increase the amount of trivalent antimony during synthesis of the phosphor, they do not ensure that all of the antimony and manganese which are present during synthesis are available in the trivalent and divalent forms, respectively. Optimum performance of the phosphor cannot be obtained unless the activators are present in their lowest oxidation states.

U.S. Pat. No. 3,430,089 to Sarver et al. discloses the addition of divalent zinc to calcium halophosphate phosphor to improve light output and maintenance.

We have determined that optimum improvement in light output and maintenance is obtained when the divalent zinc compound is zinc phosphide. Additionally, greater amounts of input zinc are retained when zinc phosphide is used as the source of zinc. The use of other divalent zinc compounds, including zinc oxide, does not provide the benefits previously associated with the use of divalent zinc generally.

It would be an advantage in the art to provide a method of making an improved alkaline earth metal halophosphate phosphor activated by antimony and manganese.

It would also be an advantage in the art to provide a method of making alkaline earth metal halophosphate phosphor activated by antimony and manganese in which the activators are present during synthesis in their lowest oxidation states.

SUMMARY OF THE INVENTION

It is therefore an object of this invention to obviate the disadvantages of the prior art.

It is another object of this invention to enhance methods of making alkaline earth metal halophosphate phosphors.

These objects are accomplished, in one aspect of the invention, by a method of making alkaline earth metal halophosphate phosphor activated by antimony and manganese, comprising the steps of: forming a uniform mixture of predetermined amounts of an alkaline earth metal phosphate, a carbonate of the same alkaline earth metal, a fluoride of the same alkaline earth metal, a source of chloride, manganese carbonate, antimony trioxide, and a metal phosphide, and firing the mixture at 1150° C. for two hours in a nitrogen atmosphere to obtain a phosphor cake. The phosphor cake is then washed in a weakly acidic solution, followed by a wash in a weakly basic solution. The washed phosphor is then dried and screened.

BEST MODE FOR CARRYING OUT THE INVENTION

For a better understanding of the present invention, together with other and further objects, advantages and capabilities thereof, reference is made to the following specification and appended claims.

We have found that during the synthesis of alkaline earth halophosphate phosphor activated by antimony and manganese, the addition of a metal phosphide as a raw material will ensure that the antimony and manganese activators are available in their lowest oxidation states (that is, trivalent antimony and divalent manganese).

It is believed that the metal phosphide acts as a reducing agent during synthesis of the phosphor. A "reducing agent" is itself oxidized (that is, electrons are removed from the atom, leaving it in a higher valence state) during a redox reaction so that other reactants may be reduced (that is, electrons are added to those atoms, leaving them in a lower valence state). During the firing step, the phosphorus in the metal phosphide is oxidized from its 3− oxidation state to a phosphate having a 5+ oxidation state. As the phosphide oxidizes, electrons are transferred to the available antimony and manganese, which are thereby reduced. In the presence of a metal phosphide, pentavalent antimony reduces to the trivalent state; any antimony which is already in the trivalent state remains trivalent. Similarly, tetravalent manganese reduces to the divalent state; any manganese which is already in the divalent state remains divalent. Trivalent antimony and divalent manganese are in the most suitable form for incorporation into the phosphor lattice.

The use of a metal phosphide as a reducing agent during synthesis ensures that the activators will be reduced to, or maintained at, their lowest oxidation states and will be available for incorporation into the phosphor lattice. Activator losses will be minimized, and enhanced phosphor performance (brightness and color) will result.

Any metal phosphide will act as a reducing agent in the synthesis of alkaline earth metal halophosphate phosphor. Preferred metal phosphides are alkaline earth metal phosphides, including, for example, barium phosphide, calcium phosphide and strontium phosphide. Other metal phosphides, such as zinc phosphide, antimony phosphide and manganese phosphide, may also perform satisfactorily as reducing agents. It is preferred that the metal phosphide be of the same metal as the dominant metal in the phosphor. For example, if the phosphor is a calcium halophosphate phosphor, the preferred metal phosphide is calcium phosphide.

Figure 2:
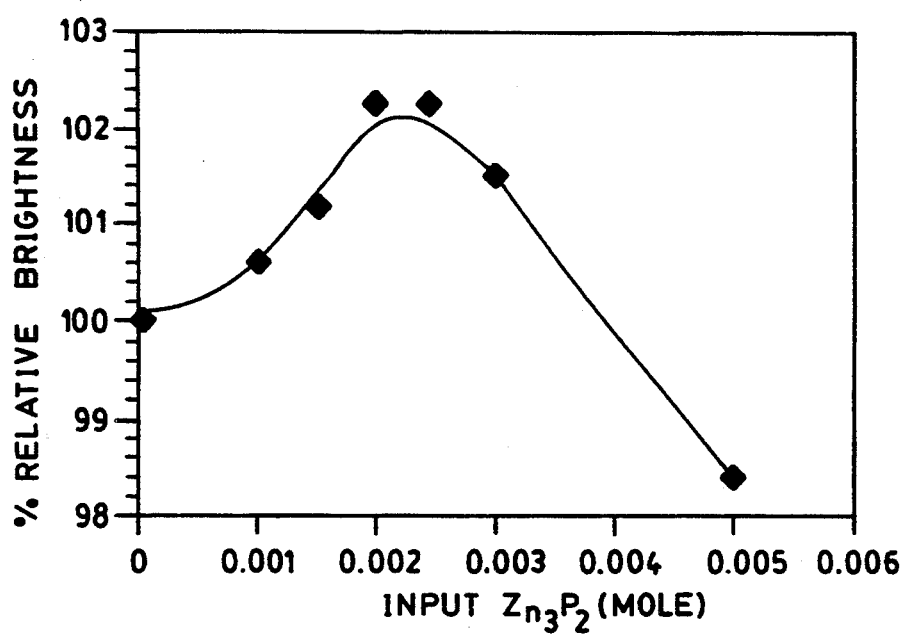
FIG. 2 is a graph which illustrates the effect on brightness of the addition of zinc phosphide during synthesis of calcium chlorofluoroapatite phosphor.
Figure 3:
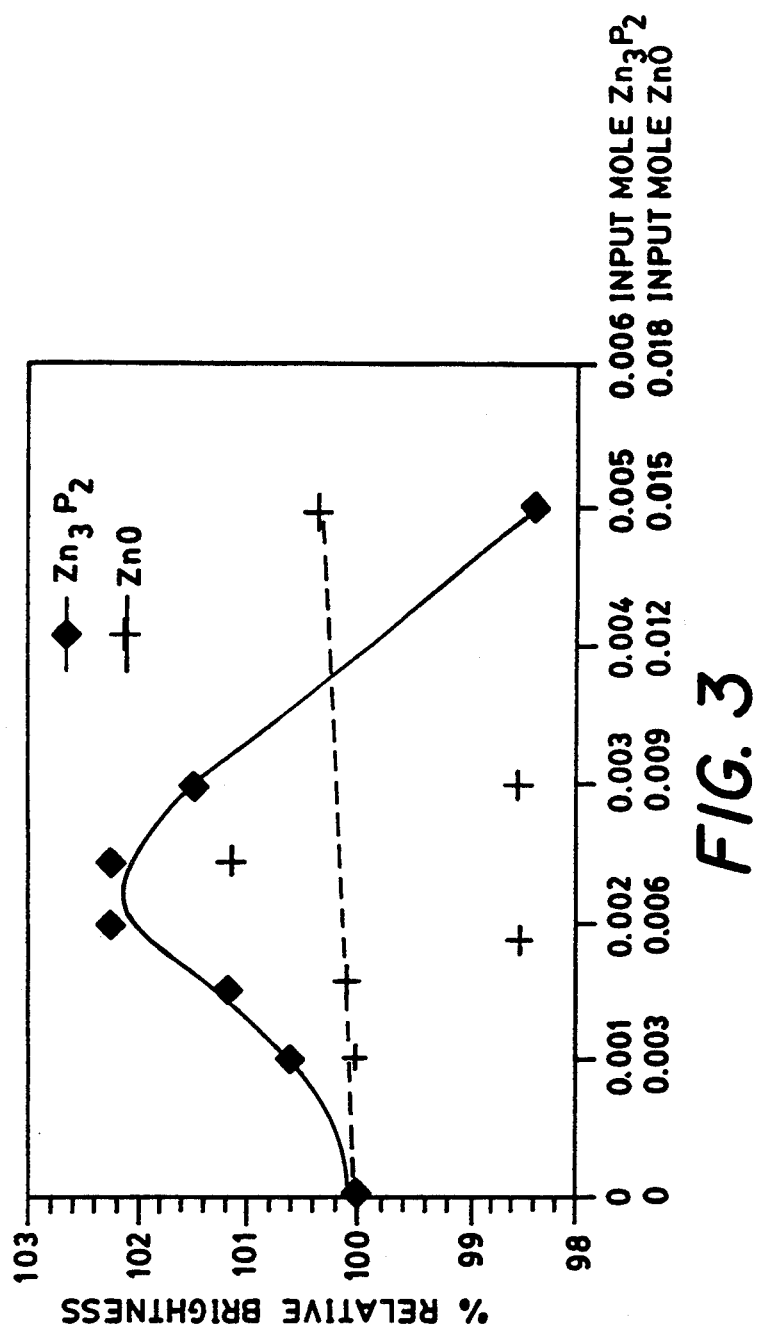
FIG. 3 is a graph which illustrates the difference in plaque brightness when zinc oxide and zinc phosphide are added to calcium chlorofluoroapatite phosphor.

We have found additionally that when zinc phosphide is added as a raw material during synthesis of calcium chlorofluoroapatite phosphor, brightness is increased. FIG. 2 shows that peak brightness is obtained at approximately 0.0022 mole of zinc phosphide added during synthesis of calcium chlorofluoroapatite phosphor. FIG. 3 shows in contrast that the addition of zinc oxide has an insignificant effect on plaque brightness when compared to the addition of zinc phosphide.

The metal phosphide may be added in amounts of up to 0.12 mole. However, optimum brightness is obtained when the amount of metal phosphide added is between approximately 0.002 to 0.0025 mole.

Figure 1:
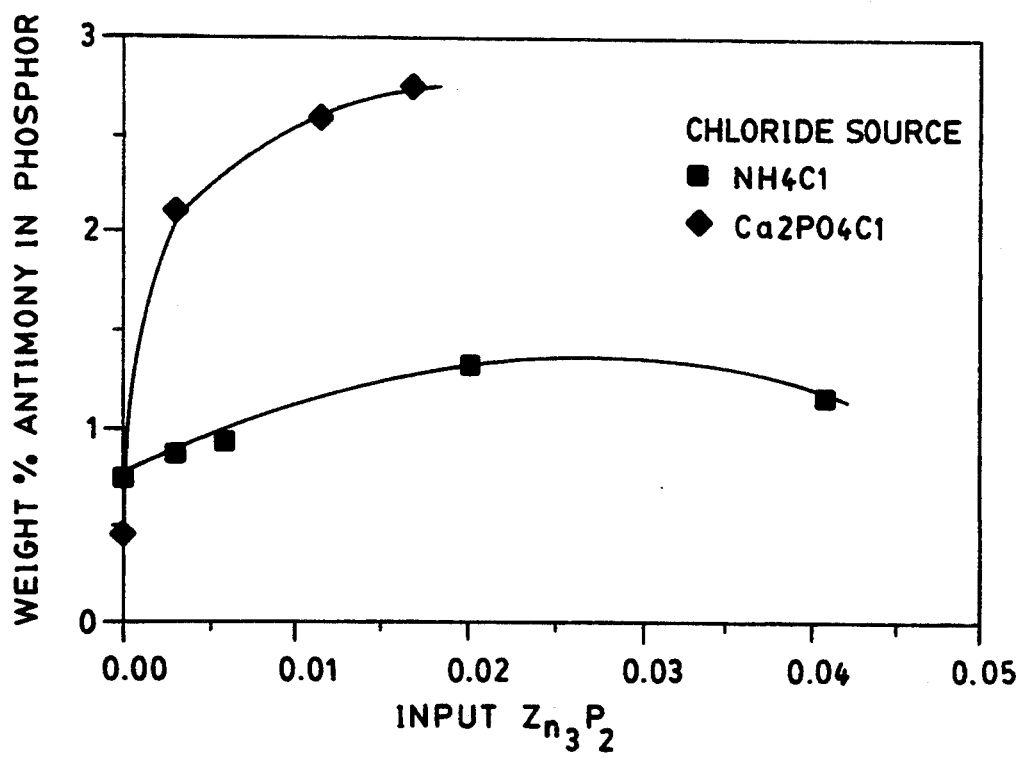
FIG. 1 is a graph which illustrates the effect of the chloride source selected on antimony retention in the phosphor.

The choice of chloride source also influences the retention of trivalent antimony. The use of an alkaline earth metal chlorospodiosite instead of ammonium chloride enhances the incorporation of trivalent antimony into the phosphor during synthesis. FIG. 1 shows that more antimony is retained in the phosphor when calcium chlorospodiosite instead of ammonium chloride is used as the chloride source during synthesis of calcium chlorofluoroapatite phosphor.

The raw materials may be blended in a V-blender with an intensifying bar until uniform and then fired in a nitrogen atmosphere at a temperature of 1150° C. for two hours to form a fired phosphor cake. The phosphor cake may then be cooled, broken up and ground. The ground phosphor may then be washed in a weakly acidic solution, such as dilute (2%) hydrochloric acid, followed by a wash in a weakly basic solution, such as dilute (1%) ammonium hydroxide. The washed phosphor may then be dried and screened through, for example, a 380 mesh screen.

The following non-limiting examples are presented.

EXAMPLE I

CALCIUM CHLOROFLUOROAPATITE PHOSPHOR MADE WITH ZINC PHOSPHIDE AND AMMONIUM CHLORIDE

The following raw materials were combined as follows:

| | |
|---|---|
| $CaHPO_4$ | 405.28 grams |
| $CaCO_3$ | 126.12 grams |
| $CaF_2$ | 35.16 grams |
| $NH_4Cl$ | 10.19 grams |
| $MnCO_3$ | 11.29 grams |
| $Sb_2O_3$ | 46.64 grams |
| $Zn_3P_2$ | 5.16 grams |

The raw materials were thoroughly mixed in a V-blender with an intensifying bar for thirty minutes and then fired at 1150° C. in a nitrogen atmosphere for 2 hours in a silica tube furnace having a four-inch outer diameter. The fired phosphor cake was then cooled, broken up and ground. The resulting phosphor powder was washed in a 2% hydrochloric acid solution followed by a 1% ammonium hydroxide solution. The washed phosphor powder was dried and then sieved through a 380 mesh screen.

EXAMPLE II

CALCIUM CHLOROFLUOROAPATITE PHOSPHOR MADE WITH ZINC PHOSPHIDE AND CALCIUM CHLOROSPODIOSITE

The following raw materials were combined as follows:

| | |
|---|---|
| $CaHPO_4$ | 376.18 grams |
| $CaCO_3$ | 84.04 grams |
| $CaF_2$ | 34.81 grams |
| $Ca_2PO_4Cl$ | 10.19 grams |
| $MnCO_3$ | 11.29 grams |
| $Sb_2O_3$ | 46.64 grams |
| $Zn_3P_2$ | 5.16 grams |

The phosphor was prepared as in Example I.

While there have been shown what are at present considered to be the preferred embodiments of the invention, it will be apparent to those skilled in the art that various changes and modifications can be made herein without departing from the scope of the invention as defined by the appended claims.

I claim:

1. A method of improving the brightness of a calcium chlorofluoroapatite phosphor activated with antimony and manganese, comprising the steps of: forming a uniform mixture of calcium hydrogen phosphate, calcium carbonate, calcium fluoride, a source of chloride, manganese carbonate, antimony trioxide, and from about 0.001 to about 0.0035 mole of zinc phosphide, said zinc phosphide being in an amount sufficient to reduce any pentavalent antimony to the trivalent state and any tetravalent manganese to the divalent state and to maintain antimony and manganese in the trivalent and divalent states, respectively; firing said mixture at 1150° C. for two hours in a nitrogen atmosphere to obtain a phosphor cake; washing said phosphor cake in a weakly acidic solution and then in a weakly basic solution to obtain a washed phosphor; and drying and screening said phosphor, said phosphor exhibiting a higher brightness than the phosphor prepared as above, absent zinc phosphide.

2. A method according to claim 1 wherein said source of chloride is ammonium chloride.

3. A method according to claim 1 wherein said source of chloride is calcium chlorospodiosite.

* * * * *